Jan. 3, 1939. G. H. BENZON, JR., ET AL  2,142,882
CONTOURING LATHE OR THE LIKE
Filed April 2, 1938   4 Sheets-Sheet 1
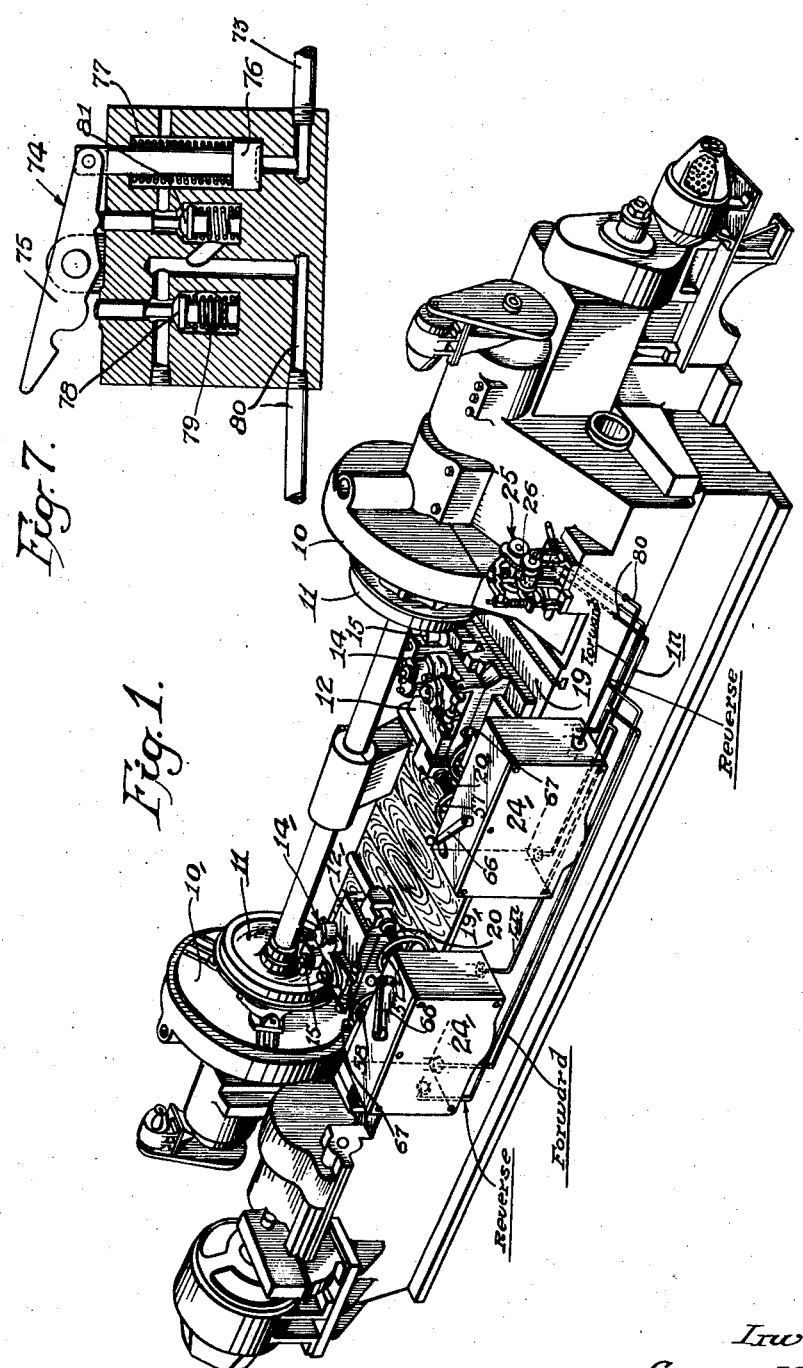
Inventor:—
George H. Benzon Jr.
Harry R. Young
by their Attorneys
Howson & Howson

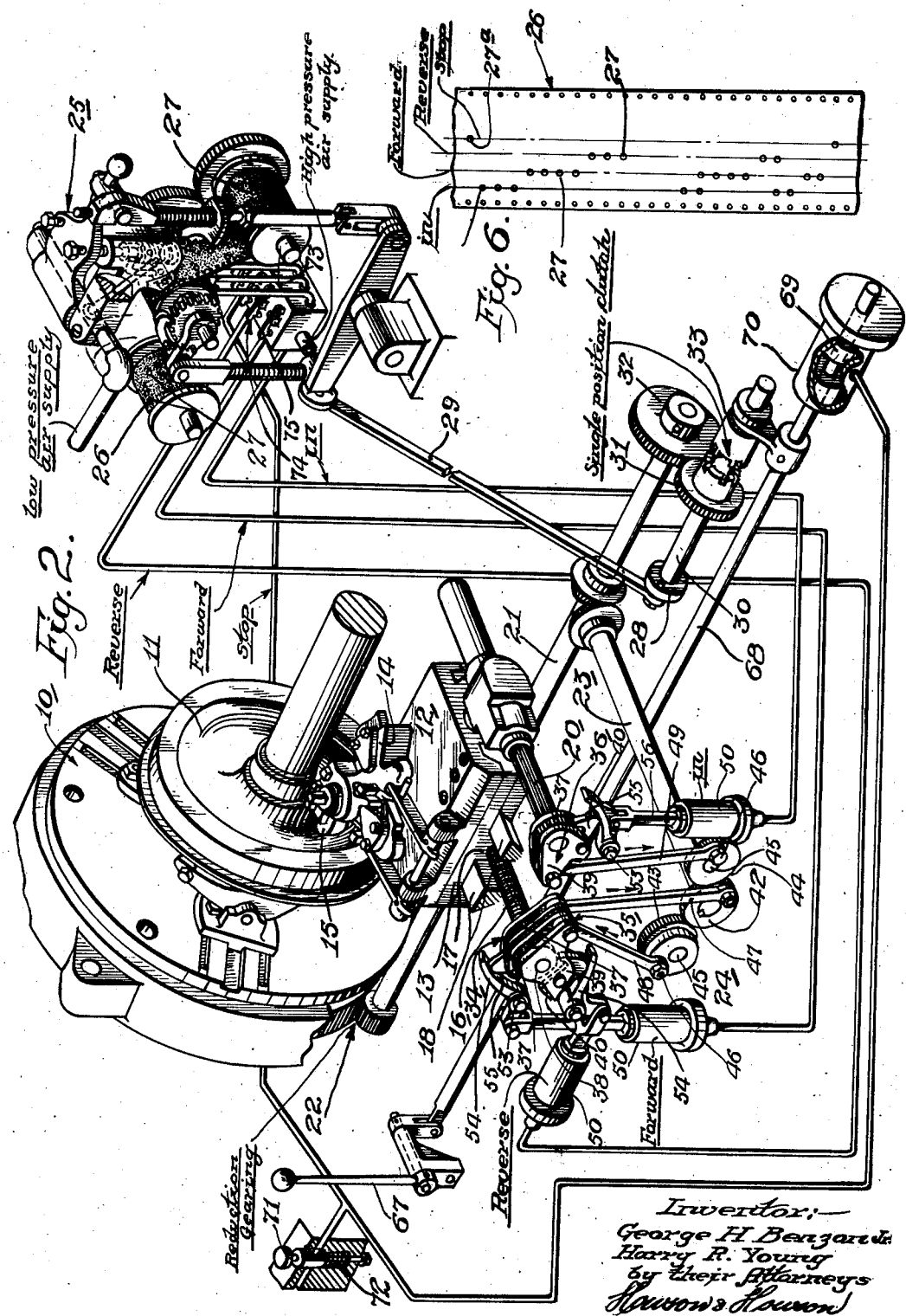

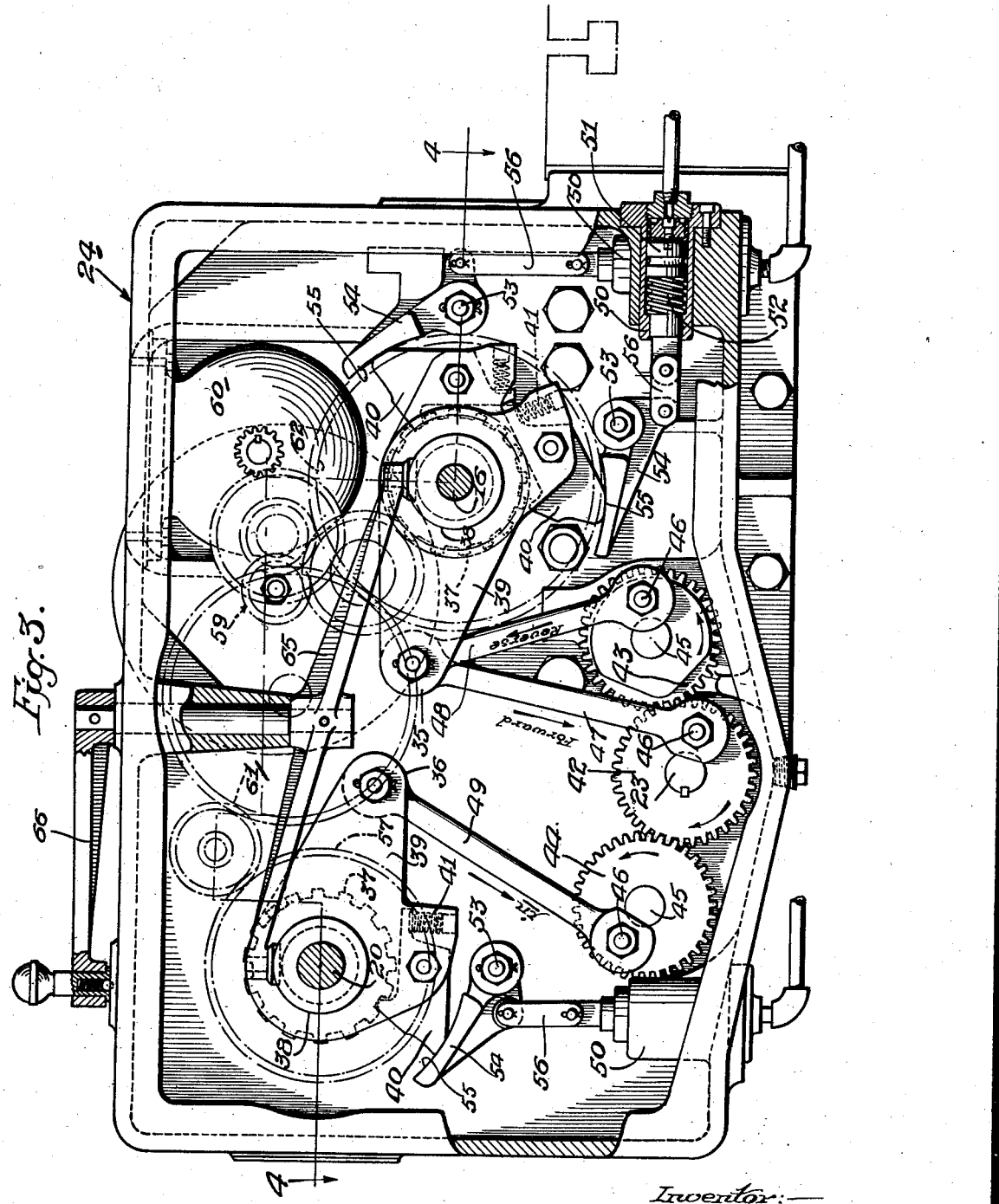

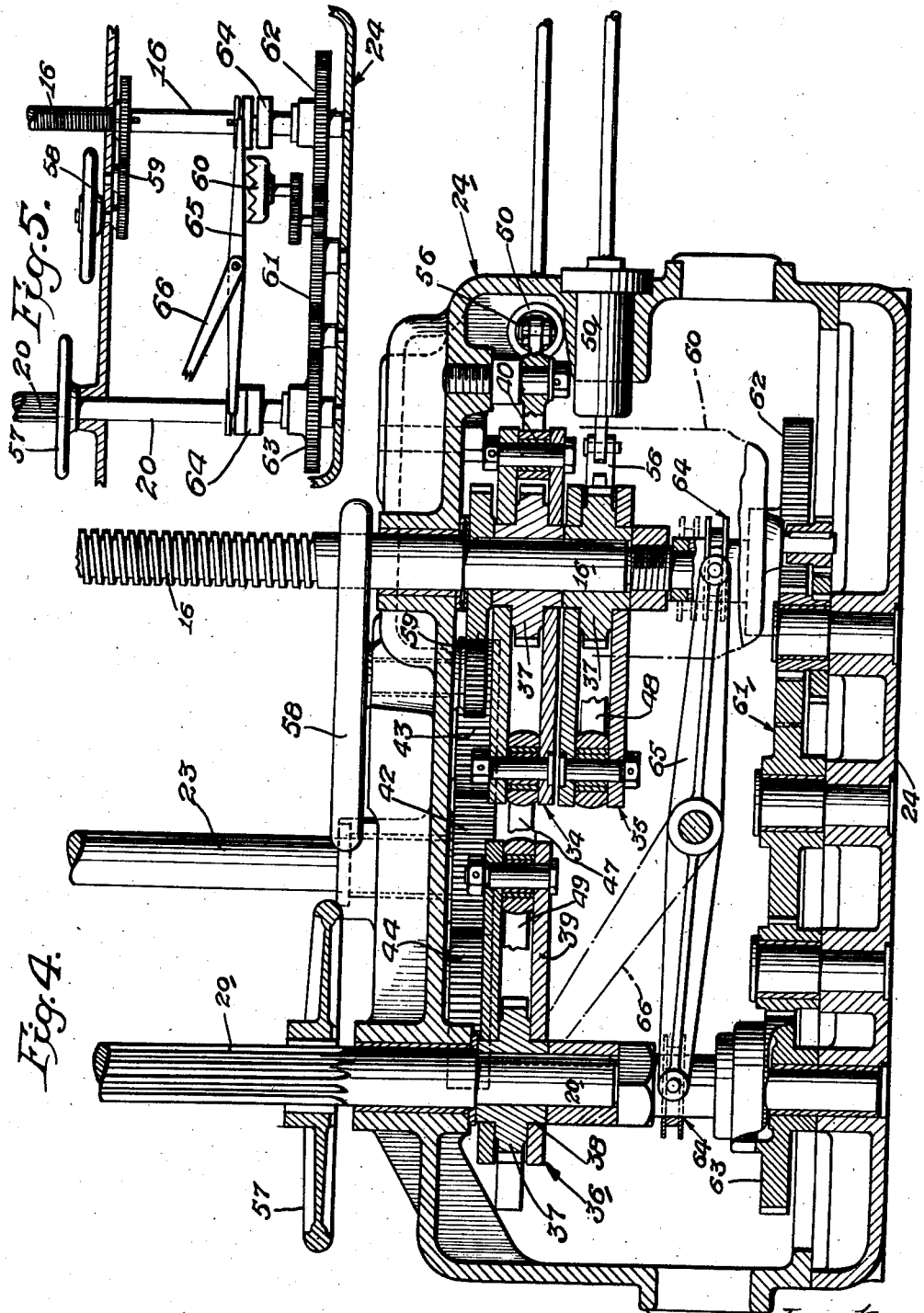

Patented Jan. 3, 1939

2,142,882

UNITED STATES PATENT OFFICE 2,142,882

CONTOURING LATHE OR THE LIKE

George H. Benzon, Jr., Jenkintown, and Harry Russell Young, Lower Merion, Pa., assignors to William Sellers & Company, Incorporated, Philadelphia, Pa., a corporation of Pennsylvania Application April 2, 1938, Serial No. 199,708

14 Claims. (Cl. 82—8)

This invention relates to a contouring lathe and has for an important object thereof the provision of a means for automatically roughing a desired contour on a suitably chucked work piece.

Important objects of the invention are provision in a structure of this character of an arrangement which may be readily adapted to any ordinary lathe with but slight alteration in the construction thereof; the reduction of the necessary mechanism to its simplest and most durable form, and the provision of an arrangement whereby all preliminary adjustments may be made with the greatest possible speed and accuracy.

A further object of the invention is the provision in an arrangement of this character of a construction such that a desired roughing finish can be obtained and in which, after preliminary adjustments have been made, the operation of the machine is entirely automatic.

These and other objects we attain by the construction shown in the accompanying drawings wherein, for the purpose of illustration we have shown our invention as applied to a wheel-contouring lathe and wherein:

Fig. 1 is a perspective view of a lathe equipped with control mechanism constructed in accordance with our invention;

Fig. 2 is a semi-diagrammatic view illustrating the control mechanism;

Fig. 3 is a detailed sectional view through one of the control boxes;

Fig. 4 is a section on line 4—4 of Fig. 3;

Fig. 5 is a semi-diagrammatic view showing the manual and power traverse for securing preliminary adjustments;

Fig. 6 is a fragmentary plan of one of the control strips utilized; and

Fig. 7 is a detail sectional view showing the high pressure air supply and release for the respective control cylinders.

Referring now more particularly to the drawings, the numeral 10 generally designates a suitably driven rotating chuck in which the work piece 11, at present shown as a car wheel, is mounted for the contouring operation. This chuck may have its axis at any desired angle, in the present illustration being horizontally disposed, and associated with the chuck is a turret assembly 12 comprising a slide 13 and the turret proper, indicated at 14, the latter carrying the cutting tool 15. The turret proper is movable both perpendicularly and longitudinally to the axis of the chuck, the perpendicular movement at present being illustrated as provided through a worm drive 16 engaging in a nut 17 on the slide 13, which slide is mounted in suitable guides 18 extending transversely of the lathe bed 19. A second worm, not shown, is operated through the medium of a spline shaft 20 and serves to shift the turret head 14 upon the slide in a direction longitudinal to the chuck axis. These movements of the turret are all conventional and well known and need no further description or illustration than that here given.

In accordance with our invention, a drive shaft 21 is provided which is synchronized with rotation of the chuck 10, being at present shown as driven therefrom by reduction gearing 22. From this drive shaft the take-off shaft 23 is led to the control box 24 within which are arranged a plurality of ratchet mechanisms hereinafter to be more particularly described for operating the worm 16 and spline shaft 20. These ratchet mechanisms are, in turn, controlled from what we term a paper tower 25 in which a strip of paper fibre, or the like, indicated at 26 and having perforations 27 therein similar to those formed in the ordinary player piano roll is fed through, and through its openings 27 a suitable air pressure supply device supplying air for the actual operation of the selected ratchet or ratchets. The paper strip is advanced step by step through this mechanism, through a crank 28 and connecting rod 29. In order that the paper movements and, accordingly, the air supply may be properly synchronized to the movement of the ratchets controlling operation of shafts 16 and 20, the shaft 30 of crank 28 is provided with a loosely mounted gear 31 meshing with a gear 32 on shaft 21, this gear 31 being clutched to shaft 30 or disengaged therefrom through a single-position clutch 33, thus insuring its proper synchronization with shaft 23.

The worm shaft 16 within the control box 24 has a pair of ratchet elements 34 and 35 which will hereinafter be referred to as the forward and reverse ratchets, while spline shaft 20 within the control box has a single ratchet 36 secured thereto. Each ratchet unit 34, 35 and 36 comprises a ratchet gear 37 keyed to the shaft with which it is associated. This gear has hub portions 38 rotatably mounting side members 39 of a frame pivotally supporting a ratchet 40 which, through a spring 41, is normally maintained out of engagement with its ratchet gear. The inner end of shaft 23 bears a gear 42 meshing with similar gears 43 and 44 mounted on stub shafts 45 carried by the casing wall of control box 24. Through crank pins 46 and connecting rods 47, 48 and 49 the gears 42, 43 and 44 are connected respectively to the frames of the ratchet units 34, 35 and 36. The ratchet elements per se of the ratchet elements 34 and 35 are reversely disposed to one another, with the result that when one of these ratchet elements is active the shaft 16 will receive a step-by-step motion in one direction, and when the other of the ratchets is active it will receive a step-by-step motion in the opposite direction.

Engagement of a particular ratchet element 40 with its associated ratchet gear 37 is controlled through a power cylinder 50 associated therewith, this cylinder having a piston 51 which is normally maintained at one end of the cylinder through a spring 52. Arranged adjacent each ratchet upon a suitable pivot 53 carried by the casing wall or other suitable support is a bell crank lever 54, one arm of which has a face 55 arcuately curved upon the path of movement of the adjacent portion of the associated ratchet member 40 but is normally so disposed that it has no effect upon the ratchet. The second arm of this bell crank lever is linked at 56 to the piston and when fluid pressure is introduced to the cylinder 50 the face 55 is so positioned that the ratchet is held in engagement with the associated ratchet gear 37. It will be obvious that this engagement will be merely momentary and only sufficient to advance the ratchet gear through a single step.

By properly proportioning the ratchet mechanism and the driving connections comprising the cranks and connecting rods connected therewith and by regulation of the pitch of the worm the amount of advance obtained for each operation can be very closely regulated. The control box 24 provides, in addition to the mechanism just described, means to provide both a manually regulated and, accordingly, slow traverse in either direction and a rapid traverse in either direction. The slow traverse through spline shaft 20 comprises a hand-wheel 57 directly secured thereto while that through worm shaft 16 comprises a hand-wheel 58 connected to the shaft 16 through gearing generally designated at 59. The rapid traverse comprises a motor 60 driving a gear train 61. Gear train 61 comprises gears 62 and 63 loosely mounted on shafts 16 and 20 respectively and selectively connectable thereto through clutches 64 controlled through shifting rod 65 and control handle 66.

In operation of a lathe embodying a control of this character the turret 14 and its tool 15 are adjusted to the proper starting point through first the rapid, and finally the manual controls for shafts 16 and 20, following which clutch 33 is engaged to start operation of the paper control and the remaining steps are fully automatic. Operation of the clutch 33 to engage the same is attained through a hand lever 67 to which is operatively connected an operating rod 68 engaging the movable member of the clutch. This operating rod, has likewise secured thereto a piston 69 operating in a cylinder 70 and fluid pressure to disengage the clutch is supplied from the paper tower 25 through stop openings 27a in strip 26. After a stop operation by paper tower 25, before the clutch can be re-engaged, the fluid pressure in cylinder 70 must be released and this is effected through a manually operable control valve 71 arranged at some convenient point adjacent the hand lever and normally maintained in a closed position through a spring 72.

It will be obvious from the foregoing that through mechanism such as that just described it is possible to control the movements of the tool 15 through any desired sequence of steps, thus providing the desired contour upon the work piece 11 through this series of steps. It will also be obvious that any desired number of sets of series of steps may be produced upon the paper strip and consecutively thrown into operation while permitting intermediate such operations such manual control of the tool position as is necessary to place this tool in the proper initial position for the beginning of the contouring operation.

Any suitable means may be employed to control the air supply through medium of the openings 27, 27a to the respective control cylinders. In the present instance the paper tower 25 is shown as provided with low and high pressure air supply lines. The low pressure air supply line delivers its fluid through the openings of the strip and conduits 73 to a base structure mounting control units 74 corresponding in number and arrangement to the cylinders. The control units each embody a pivoted lever 75 controlled by a piston 76 operated by the low pressure air and a spring 77. This lever coacts with a valve 78 controlling the supply of air from the high pressure line, indicated at 79, to the cylinder supply line 80. The units associated with the cylinders 50 also include an exhaust valve 81 which is opened to release the air in cylinders 50 when the piston 76 is positioned as a result of operation of spring 77. In the case of the control for the cylinder 70, this exhaust valve 81 is omitted, the manually operable valve 71 providing the exhaust control.

While the above discussion has been entirely of a lathe construction, it will be understood that the illustration and description are entirely illustrative and by no means encompass the scope of our invention, for the structure may, obviously, be adapted to almost any machine tool. For example, if it is desired to apply the structure to a shaper or other similar construction wherein the tool is moved longitudinally of the work, it is simply necessary to utilize the ratchet mechanism to control the cutting position of the tool with relation to the work, as in the example given. It is, furthermore, obviously possible, through increasing the possible functions of the tool support, to increase the variety of movements which may be imparted through the control mechanism described.

Since the construction illustrated is, obviously, capable of considerable modification without departing from the spirit of our invention, we do not wish to be understood as limiting ourselves thereto except as hereinafter claimed.

We claim:
1. In a contouring lathe or the like a rotating work chuck, a tool support movable axially and transaxially to the chuck, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, and a common drive synchronized with rotation of the chuck for oscillating said ratchet mechanisms and operating said feeding mechanism for the strip.

2. In a contouring lathe or the like a rotating work chuck, a tool support movable axially and transaxially to the chuck, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, and a common drive synchronized with rotation of the chuck for oscillating said ratchet mechanisms and operating said feeding mechanism for the strip, the connection between said drive and said strip-feeding mechanism including a single-position clutch.

3. In a contouring lathe or the like a rotating work chuck, a tool support movable axially and transaxially to the chuck, a pair of shafts controlling movements of said tool support, ratchet mechanisms associated with said shafts and each embodying a normally disengaged pawl, a fluid-pressure operated means for engaging each pawl, a perforated strip controlling the fluid pressure supply to said pawl-engaging means, means to feed said strip step by step, a common drive synchronized with rotation of the chuck for oscillating said ratchet mechanisms and operating said feeding mechanism for the strip, the connection between said drive and said strip-feeding mechanism including a single-position clutch, and fluid-pressure-operated means controlled by said strip for disengaging said clutch.

4. In a contouring lathe or the like a rotating work chuck, a tool support movable axially and transaxially to the chuck, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, a common drive synchronized with rotation of the chuck for oscillating said ratchet mechanisms and operating said feeding mechanism for the strip, power-operated means to selectively rotate said shafts, and manually operable means to rotate said shafts.

5. In a contouring lathe or the like a rotating work chuck, a tool support movable axially and transaxially to the chuck, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, a common drive synchronized with rotation of the chuck for oscillating said ratchet mechanisms and operating said feeding mechanism for the strip, power-operated means to selectively rotate said shafts, and manually operable means to rotate said shafts, the connection between said drive and said strip-feeding mechanism including a single-position clutch.

6. In a contouring lathe or the like a rotating work chuck, a tool support movable axially and transaxially to the chuck, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, a common drive synchronized with rotation of the chuck for oscillating said ratchet mechanisms and operating said feeding mechanism for the strip, power-operated means to selectively rotate said shafts, manually operable means to rotate said shafts, the connection between said drive and said strip-feeding mechanism including a single-position clutch, and fluid-pressure-operated means controlled by said strip for disengaging said clutch.

7. A device as claimed in claim 1 wherein a high pressure air supply means is provided for said cylinders, valves control the supply of fluid to and exhaust of fluid from said cylinders, and means to control said valves comprising a pressure cylinder receiving a pressure fluid through the openings of said strip.

8. A device as claimed in claim 4 wherein a high pressure air supply means is provided for said cylinders, valves control the supply of fluid to and exhaust of fluid from said cylinders, and means to control said valves comprising a pressure cylinder receiving a pressure fluid through the openings of said strip.

9. In a contouring apparatus of the class described, a work support, a tool support movable toward and away from and across the work, a tool carried thereby, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, means to cause working traverse between the work and tool support, and a common drive synchronized with such traverse for oscillating said ratchet mechanisms and operating said feeding mechanism for the strip.

10. In a contouring apparatus of the class described, a work support, a tool support movable toward and away from and across the work, a tool carried thereby, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, means to cause working traverse between the work and tool support, and a common drive synchronized with such traverse for oscillating said ratchet mechanisms and operating said feeding mechanism for the strip, the connection between said drive and said strip-feeding mechanism including a single-position clutch.

11. In a contouring apparatus of the class described, a work support, a tool support movable toward and away from and across the work, a tool carried thereby, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, means to cause working traverse between the work and tool support, and a common drive synchronized with such traverse for oscillating said ratchet mechanisms and operating said feeding mechanism for the strip, the connection between said drive and said strip-feeding mechanism including a single-position clutch, and fluid-pressure-operated means controlled by said strip for disengaging said clutch.

12. In a contouring apparatus of the class described, a work support, a tool support movable toward and away from and across the work, a tool carried thereby, a pair of shafts controlling movements of said tool support, ratchet mechanisms associated with said shafts and each embodying a normally disengaged pawl, a fluid-pressure-operated means for engaging each pawl, a perforated strip controlling the fluid pressure supply to said pawl-engaging means, means to feed said strip step by step, means to cause working traverse between the work and tool support, a common drive synchronized with such traverse for oscillating said ratchet mechanisms and operating said feeding mechanism for the strip, power-operated means to selectively rotate said shafts, and manually operable means to rotate said shafts.

13. A device as claimed in claim 9 wherein a high pressure air supply means is provided for said cylinders, valves control the supply of fluid to and exhaust of fluid from said cylinders, and means to control said valves comprising a pressure cylinder receiving a pressure fluid through the openings of said strip.

14. A device as claimed in claim 12 wherein a high pressure air supply means is provided for said cylinders, valves control the supply of fluid to and exhaust of fluid from said cylinders, and means to control said valves comprising a pressure cylinder receiving a pressure fluid through the openings of said strip.

GEORGE H. BENZON, Jr.
HARRY RUSSELL YOUNG.